W. E. DE GRAFF.
BUTCHER BLOCK CLEANER.
APPLICATION FILED JAN. 2, 1915.
1,139,500.
Patented May 18, 1915.
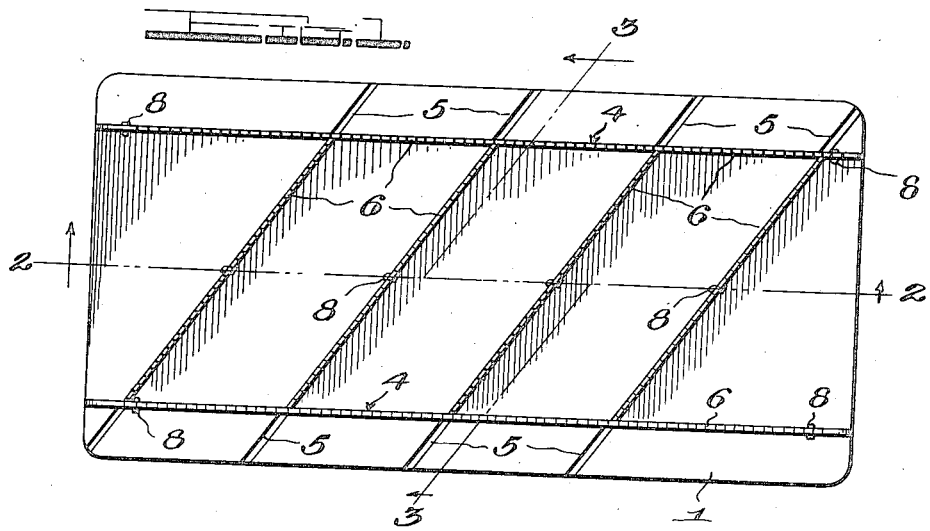
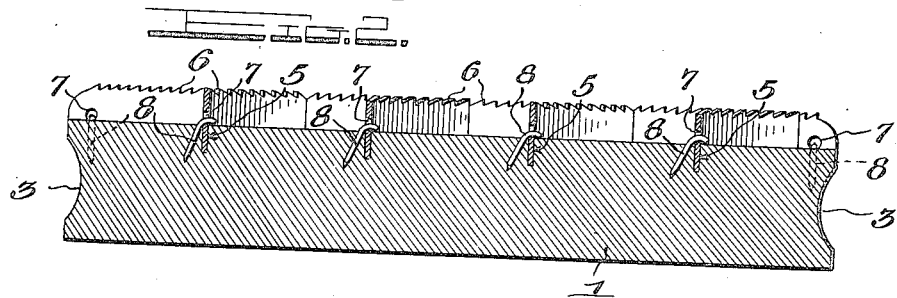
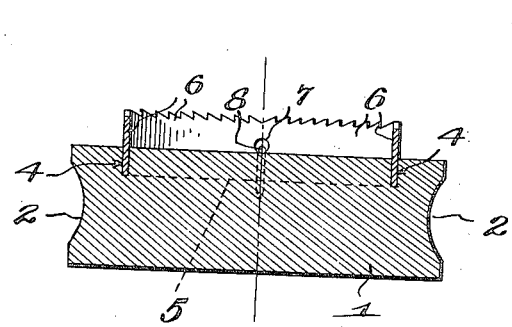
Witnesses
Inventor
William E. De Graff.
By
Attorney

UNITED STATES PATENT OFFICE.

WILLIAM E. DE GRAFF, OF BRIDGEPORT, CONNECTICUT.

BUTCHER-BLOCK CLEANER.

1,139,500.  Specification of Letters Patent.  Patented May 18, 1915.

Application filed January 2, 1915. Serial No. 154.

*To all whom it may concern:*

Be it known that I, WILLIAM E. DE GRAFF, a citizen of the United States, residing at the city of Bridgeport, county of Fairfield, State of Connecticut, have invented certain new and useful Improvements in Butcher-Block Cleaners; and I do declare the following to be a full, clear, and exact description of the invention, such as will enable others skilled in the art to which it appertains to make and use the same.

This invention relates to certain new and useful improvements in butcher block scrapers and cleaners and the primary object thereof is to provide a cleaner which will effectively perform its work on the block regardless of whether the operator moves the cleaner back and forth; sidewise or with a rotary sweep of his arm.

Further the invention resides in the specific manner of connecting the blades to the holder and in the arrangement of the blades.

Other and further objects will be later herein set forth and manifested.

In the drawings: Figure 1 is a bottom plan view of the invention; Fig. 2 is a section on the line 2—2 of Fig. 1; and Fig. 3 is a section on the line 3—3 of Fig. 1.

In proceeding in accordance with the present invention, a holder composed of a wooden block 1 is utilized, which block has concave sides and ends 2 and 3 to receive the operator's fingers so as to enable the block to be firmly gripped in the hand.

The block is provided with parallel side grooves 4 and with a series of inclined transverse and parallel grooves 5 which latter intersect the side grooves 4. Each of the aforementioned grooves receives a saw blade 6. The saw blades are provided with apertures 7 in which the bent upper ends of pins or staples 8 are received, the pins being driven into the wooden block and by being clenched to the saw blades serve to anchor the latter to the block.

In order to render the cleaner effective in its work regardless of the direction in which the operator may move the holder, a special arrangement of the teeth of the blades has been devised, namely the teeth of the two side blades extend in opposite directions, while the alternate transverse inclined blades have their teeth extending in opposite directions as clearly illustrated in Figs. 2 and 3 of the drawings. The teeth of each blade may be alternately staggered sidewise after the manner of a rip saw.

By reason of the ends of the transverse blades abutting the side blades, it will be apparent that the former are braced and held against longitudinal movement in the grooves.

From the above it will be apparent that some of the teeth will positively bite or dig into the butcher block regardless of the direction in which the cleaner may be moved, in other words some of the teeth are in digging action at all times throughout the scraper movements.

The provision of the grooves and staples affords a very convenient way of assembling and securing the saw blades in position, but, of course, the blades may be secured in position in any suitable manner.

Also, while I prefer the arrangement of blades shown and described, it will, of course, be apparent that the disposition of these blades may be varied without departing from the spirit of my invention, so long as some of the blades have the teeth extending in one direction while other blades have such teeth extending in reverse directions.

What is claimed is:

1. In a butcher block cleaner, a wooden block having parallel side grooves and parallel transverse diagonal grooves which intersect the side grooves, and saw blades anchored in the grooves, the ends of the transverse blades having their ends abutting the inner sides of the blades in the side grooves, the teeth of the side blades being oppositely disposed and the teeth of the alternate transverse blades being oppositely disposed.

2. In a butcher block cleaner, a wooden block having parallel side grooves, and diagonally disposed transverse grooves which intersect the side grooves, saw blades mounted in the grooves, the transverse blades having their ends engaged with the inner sides of the parallel side blades, each of said blades having apertures formed therein and adjacent the face of the block, and a series of independent pins driven through the respective apertures into the block and having their upper ends clenched into the apertures and in engagement with the adjacent face of the block.

In testimony whereof I affix my signature in presence of two witnesses.

WILLIAM E. DE GRAFF.

Witnesses:
F. W. SMITH, Jr.,
M. T. LONGDEN.